Aug. 7, 1951     A. J. JOHNSTON     2,563,041
TOTALIZATOR SYSTEM
Filed March 22, 1948     6 Sheets-Sheet 1

INVENTOR.
Arthur J. Johnston.

Aug. 7, 1951 A. J. JOHNSTON 2,563,041
TOTALIZATOR SYSTEM
Filed March 22, 1948 6 Sheets-Sheet 2
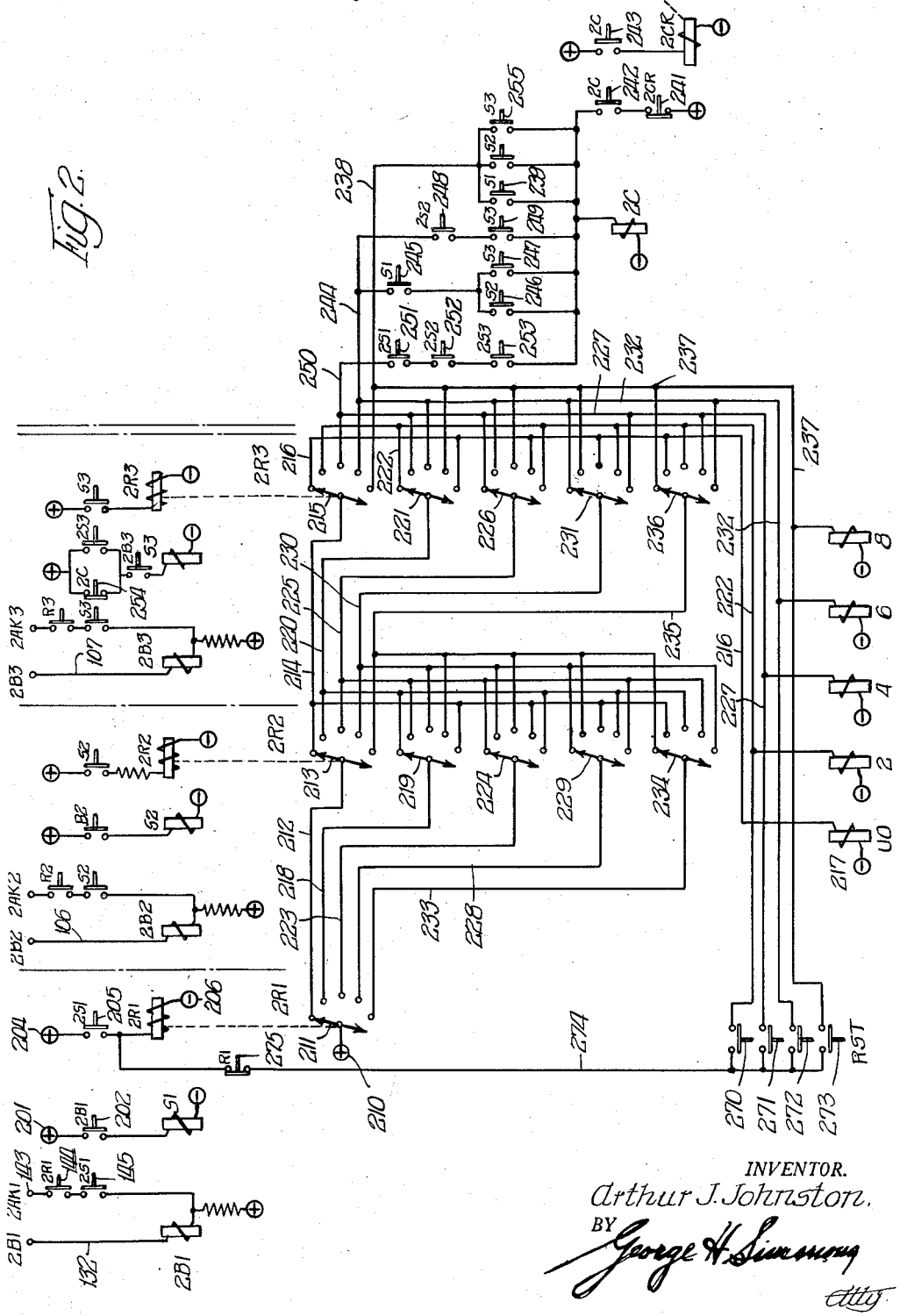
INVENTOR.
Arthur J. Johnston,
BY

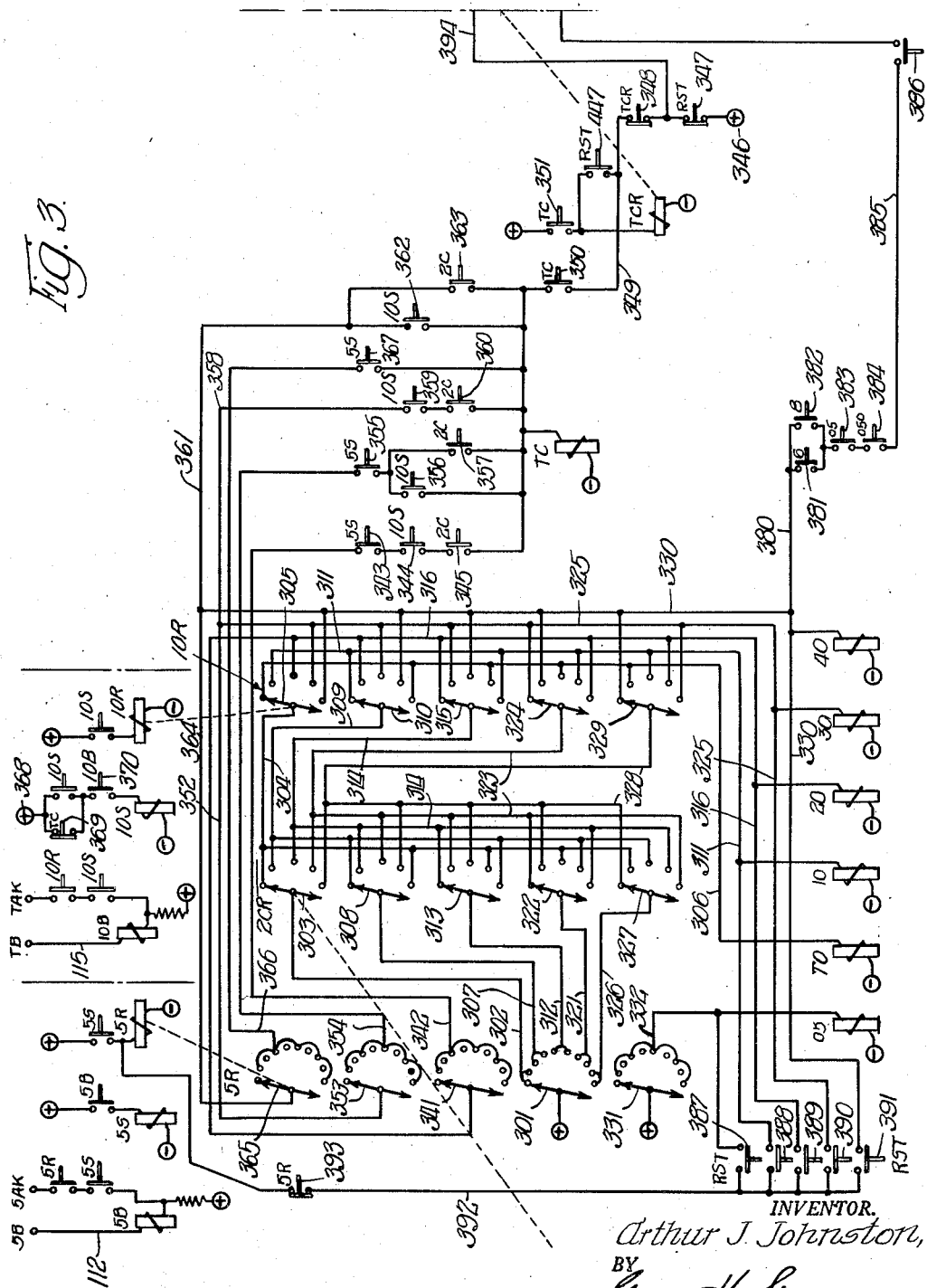

Aug. 7, 1951  A. J. JOHNSTON  2,563,041
TOTALIZATOR SYSTEM
Filed March 22, 1948  6 Sheets-Sheet 4

INVENTOR.
Arthur J. Johnston,
BY George H. Simmons
Atty.

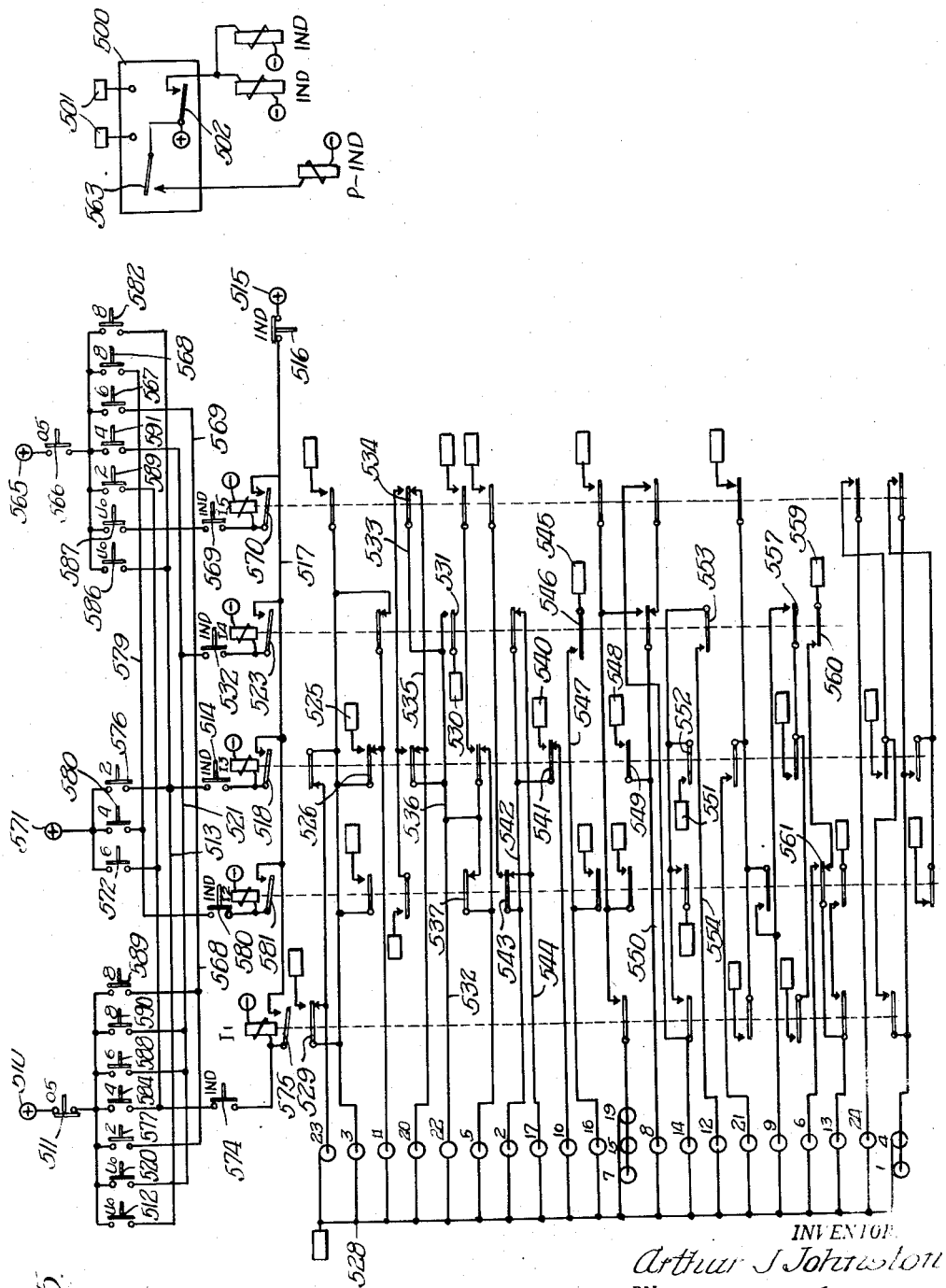

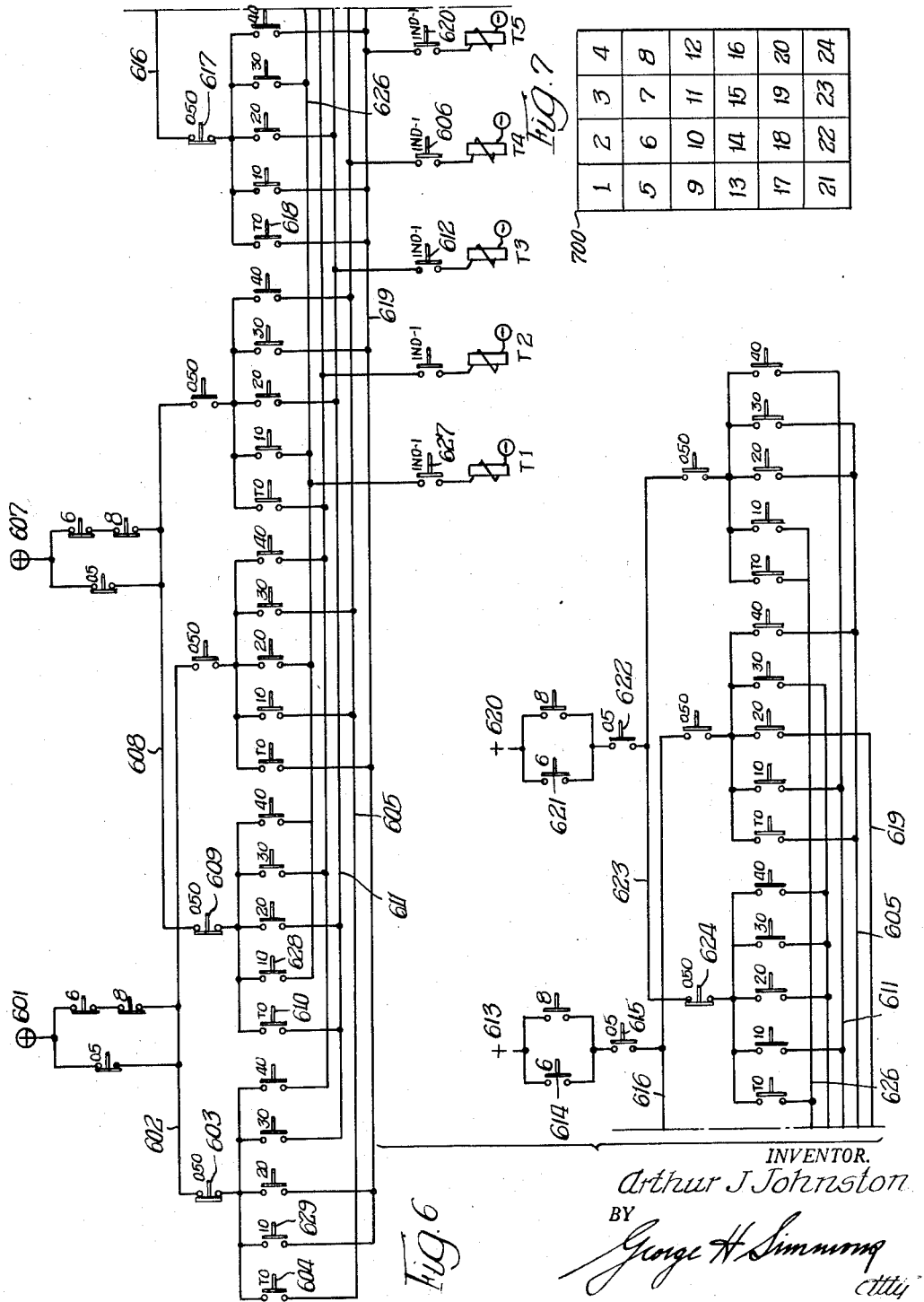

Patented Aug. 7, 1951

2,563,041

UNITED STATES PATENT OFFICE 2,563,041

TOTALIZATOR SYSTEM

Arthur J. Johnston, Baltimore, Md., assignor to American Totalisator Company, Inc., Baltimore, Md., a corporation of Maryland Application March 22, 1948, Serial No. 16,310

12 Claims. (Cl. 235—92)

This invention relates to totalisator system adding machines and has for its principal object the provision of a new and improved device of this kind.

It is a main object of the invention to provide an adding machine capable of registering a plurality of values simultaneously, accurately and rapidly, and to transfer values from one digit to the next higher as the sums accumulated in the machine necessitate such transfers.

Another object of the invention is to provide an adding machine register that is controllable over a plurality of channels to receive and register incoming values, arranged to momentarily render one of said channels inoperative during the transfer of values out of the register.

Another object of the invention is to provide an improved fundamental circuit for controlling a totalisator system over which circuit values are simultaneously registered in two, interconnected adding machines with greater speed and accuracy, which machines, at the completion of said registrations, jointly control a ticket machine which prints and issues a ticket corresponding to the value registered.

Further objects of the invention not specifically mentioned here will be apparent from the detailed description and claims which follow, reference being had to the accompanying drawings in which a preferred embodiment of the invention is shown by way of example and in which:

Fig. 1 is a diagrammatic layout of the system employing the invention and showing particularly the fundamental control circuit;

Fig. 2 is a schematic diagram showing particularly the units register and control therefor;

Fig. 3 is a schematic diagram showing particularly the tens register and control therefor;

Fig. 5 is a schematic diagram of the units indicator and circuits controlling the same;

Fig. 6 is a schematic diagram of the tens indicator control circuits; and

Fig. 7 is a diagrammatic view of an indicator panel showing the numbers of the lamps therein.

Figure 4:
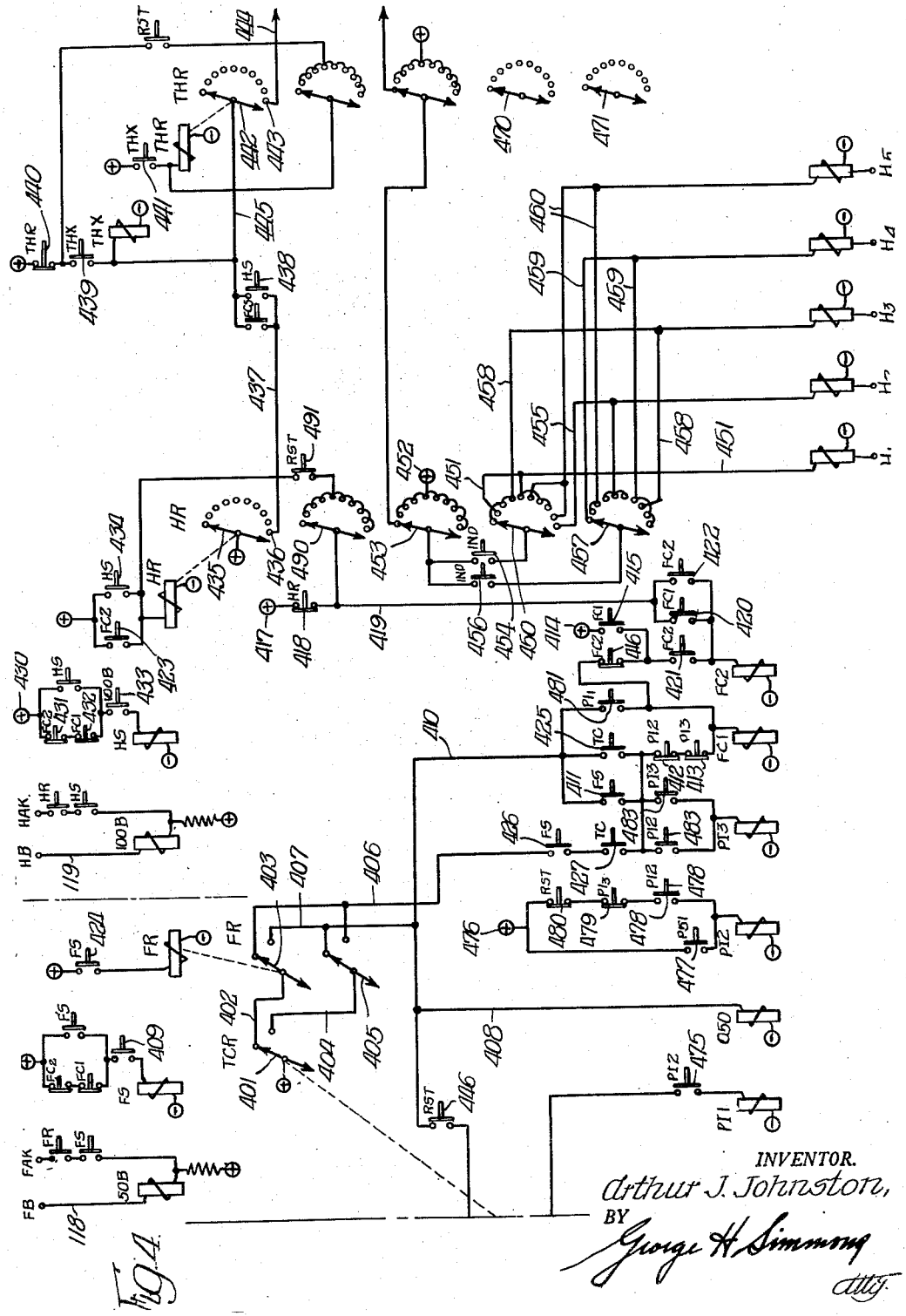
Fig. 4 is a schematic diagram showing particularly the fifties, the hundreds, and the thousands registers and controls therefor.

The totalisators, such as are employed to register wagers at a race track, for example, must be capable of operating at very high speed; however, the speed must not be achieved at the expense of accuracy. In accordance with the teachings of the present invention, in order to achieve higher speeds without sacrificing accuracy, the adding machines employed are each capable of receiving and registering a plurality of wagers or other sales transactions simultaneously. Thus, in one example, the adding machines employed at a race track are equipped to handle three independent channels over which two-dollar ticket sales are controlled, and in addition are equipped with one five-dollar channel, one ten-dollar channel, one fifty-dollar channel, and one one-hundred-dollar channel, so that each of the adding machines is capable of accepting seven transactions simultaneously.

As will be readily apparent to one skilled in the art, this feeding into the adding machine of numerous simultaneous transactions of various denominations necessitates an accurate transfer system whereby values of a lower denomination, units for example, are transferred to the tens digit section of the machine when the values accumulated in the unit section equal ten. This transfer must be made at high speed and frequently will have to be made simultaneously with the registering of transactions originating in the tens digit section of the machine.

One of the objects of the present invention is to improve upon register and transfer circuits so that the speed can be increased without sacrificing accuracy.

As will be seen in Fig. 1, which is a typical installation of the type to which the instant invention refers, a total adding machine 100 is connected to the searching end of a collecting device 101, as is diagrammatically illustrated by connections leading to the wipers 102. While a stepping switch type of collector is illustrated, it is shown by way of example only, as other types of collector devices, such far example the all-relay collector shown in Patent #2,179,698 issued to Levy and Johnston November 14, 1939, may be substituted if desired. Whatever the collector device may be, it searches over a plurality of ticket-issuing machines illustrated at 103, wherein the first machine in the group is shown.

Within the ticket machine are a plurality of keys 104, one for each runner upon which the machine is designed to issue tickets, which keys are depressed to select the particular runner. Depressing the key extends the circuit to an individual runner adding machine 105 preparatory to closing a basic circuit over which the sale of the ticket is registered in both the total and individual runner adding machines, and after which the ticket machine is operated to print and issue the ticket.

The particular type of ticket machine used is not of the essence of the present invention and there are suitable machines available on the open market. For example, ticket printing and issuing machines of the type shown in Patents #1,886,626 and #1,886,627, issued to H. D. Black on November 8, 1932, have been used successfully.

The total adding machine is also equipped with two other channels 106 and 107 which lead to separate collectors 108 and 109, respectively, which in turn lead to similar ticket machines 110 and 111, and through keys in these machines to the same group of individual adding machines as contains machine 105. The total adding machine 100 also contains a five-units channel 112 which has an individual collector 113 that searches over a group of five-units ticket machines 114, through which connections are extended to the adding machines 105. Similarly, there is a ten-units channel 115 with its collector 116 leading to a group of ten-units ticket machines 117 which in turn extend circuits to the adding machines 105. The adding machine 100 also has a fifty-units channel 118 and a hundred-units channel 119 which, in the example shown, are connected to a dual-purpose collector 120 wherein searching means 121 and 122 are individual to the two channels respectively, the searching means 121 leading to a group of fifty-units ticket machines 123, and the searching means 122 leading to a group of one-hundred-units ticket machines 124. Both of the ticket machines 123 and 124 extend circuits to the adding machine of which machine 105 is an example.

The units referred to above, in the case of a total adding machine for race track work, will be dollars, channels 102, 106, and 109 being two-dollar channels and lead to the three groups of two-dollar ticket machines, each group of which contains a plurality of individual ticket machines, and there may be as many ticket machines in each group as desired, limited only by the capacity of the collectors. Preferably, however, the number of ticket machines in a particular group should be maintained as small as possible, thereby to minimize the time required for the collectors to search out an individual machine and consequently reduce the time that must elapse between successive operations of that individual machine. The total number of ticket machines will, of course, depend upon the requirements of a particular installation and the number of machines in a group will vary accordingly.

The fundamental circuit over which the total and individual runner adding machines are operated to register a transaction and when that registration is completed the ticket machine is operated to print and issue the ticket, will be recognized as similar to the series circuit shown in Patent #2,182,875, issued to Levy December 12, 1939.

When the collector extends a connection to ticket machine 103, in which the key 104 is depressed to indicate a selection of runner number one, a circuit may be traced from positive at 130, through a resistor 131, through the winding of the relay 2B1, conductor 132, through the collector device 102 and contact engaged thereby, conductor 133, through the winding of relay 134 in the ticket machine, through the normally closed contacts 135 controlled by the relay 134, through key 104 and its make contact, conductor 136 through the winding of the relay IIB1 to negative. Relays 2B1 and IIB1, being high sensitivity relays, operate immediately, closing circuits hereinafter to be explained, to register a two-dollar transaction in both adding machines. Relay 134 being a low sensitivity relay, will not operate at this time.

In the individual adding machine 105, operation of the relay IIB1 closes a circuit to a rotary register switch which operates to close contacts 140. Operation of relay IIB1 also closes contacts 141, whereupon a circuit is extended from positive at 142 over acknowledging conductor 143 that leads to the total adding machine 100.

In the total adding machine 100, operation of relay 2B1 closes circuits to a rotary stepping switch which operates to close contacts 144 to extend this circuit to contacts 145 which are closed when the 2B1 relay operates. The acknowledging circuit is thus extended to the juncture of the resistor 131 and relay 2B1 to apply positive to both terminals of the resistor, thereby to remove the resistor from the circuit and consequently increase the current flow therein. This added current flow operates relay 134 in the ticket machine, whereupon that machine functions to print and issue a ticket and also to open the fundamental circuit, by opening contacts 135 so as to release the collector 101 to permit it to seek out another ticket machine in the group in which a key is depressed to indicate a pending transaction.

The substitution of a resistor, such as 131, in series with the relays in the fundamental circuit for the resistor placed in parallel with one of the relays as in the above mentioned Levy patent, permits achieving a greater difference between the low current value and the high current value, and consequently the high sensitivity relays can be adjusted to operate faster without danger of a misoperation of the low sensitivity relay, and as a result both the speed and accuracy of the circuit has been improved.

Within the adding machines, the closing of the fundamental circuit as above initiates operation leading to the registration of the value of the transaction. In Figs. 2, 3, and 4, there are shown the circuits of the units, tens and hundreds registers of a total adding machine. The circuits of the individual adding machines are identical, except that the fundamental circuit relays IIB1, for example, are connected to negative instead of through resistors to positive, as shown in these figures.

*Registering a two-units ticket sale*

As will be seen in Fig. 2, the operation of relay 2B1, as above explained, closes a circuit from positive at 201, through normally open contacts 202 that are closed when the relay operates, through the winding of a sleeve relay S1 to negative at 203. The slave relay operates over this circuit. In order to keep the speed of the high sensitivity relays in the fundamental circuit, of which 2B1 is an example, as high as possible, the number of springs carried by the relay is maintained at a minimum; and slave relays, such as S1, are employed to carry such additional springs as may be necessary. Each time the fundamental relay 2B1 operates, its slave S1 is also operated, and so far as the electrical connections are concerned it is the same as if only one relay was operated.

Operation of the relay S1 closes a circuit from positive at 204 through springs 205 on S1, through the magnet 2R1 of the register switch 2R1 to negative at 206. The register switch 2R1 preferably consists of a rotary switch having one or more wipers which step over a bank of contacts sequentially, the stepping movement being accomplished as the magnet deenergizes rather than as the magnet energizes. Stepping switches of this type are readily available, the one preferably used having banks of contacts containing twenty contacts in each row and as many as five rows of contacts may be conveniently used without overloading the switch.

Operation of relay S1 also closes contacts 145 thereby to prepare a point in the acknowledging circuit over conductor 143. As soon as magnet 2R1 operates, contacts 144 are closed, thereby to extend the acknowledging circuit which will be completed immediately if the registration has been completed in the individual adding machine.

As will be seen in Fig. 2, the conductor 106 in the second channel in the group leads to a similar fundamental relay 2B2 which in turn controls an S2 relay, thereby to close a circuit to the second register magnet 2R2 to register a transaction received over the second channel. The third channel conductor 107 leads to a fundamental relay 2B3 which operates to control its slave S3 thereby to control the magnet 2R3 of a third stepping switch.

In the units register, the stepping switch 2R1 employs but a single wiper that engages a row of contacts, five of which are employed, and multiple connections are used so that the wiper sweeps over this group of five contacts four times in traveling over the row of contacts; that is to say, contact 1 in the row is connected in multiple with contacts 6, 11, and 16; contact 2 with 7, 12, and 17, etc. Register switch 2R2 employs five wipers, each of which engages a row of twenty contacts, five of which are employed, and the remaining contacts use multiple connections to these in the same manner as in the switch 2R1. Switch 2R3 likewise employs five wipers with five contacts employed in each row, and multiple connections are used as in the other switches.

Switches 2R1, 2R2, and 2R3 jointly control units register relays U0, 2, 4, 6, and 8, by the operation of which relays values of zero units, two units, four units, six units, or eight units, respectively, are registered in the register. With the switches in the position shown in Fig. 2, a circuit may be traced from positive at 210 through wiper 211 of the switch 2R1, conductor 212 which leads to wiper 213 of the switch 2R2, which wiper is engaging the contact to which conductor 214 is connected, which conductor 214 leads to the wiper 215 in the switch 2R3 which, at the moment, is standing on the contact to which conductor 216 is connected, this conductor 216 leading through the winding of relay U0 to negative at 217. U0 operates to indicate zero units in the register at the moment.

In the event that a transaction is received over any one of the channels leading into the adding machine, the circuit to relay U0 will be broken and the circuit to relay 2 will be closed in lieu thereof. Assume for the moment that the first transaction is received over the first channel, in which case relay 2B1 will operate as above, and magnet 2R1 will be operated and switch 2R1 will move wiper 211 from its first to its second contact when the magnet de-energizes. A circuit may now be traced from positive at 210 through wiper 211, conductor 218, which is connected to the second contact which is engaged by wiper 211 and leads to wiper 219 in the switch 2R2 which is standing on its first bank contact to which conductor 220 is connected, this conductor leading to wiper 221 in the switch 2R3 also standing on its first bank contact to which conductor 222 is connected, over conductor 222 through the winding of relay 2 to negative. Relay 2 operates over this circuit to indicate two units in the register.

If a second transaction is received over channel B1 before any transactions are received over the other channels, switch 2R1 will again be operated to move wiper 211 to its third bank contact to which conductor 223 is connected, this conductor leading to wiper 224 in switch 2R2 now engaging its first bank contact to which conductor 225 is connected, this conductor leading to wiper 226 in the switch 2R3. Conductor 227 is connected to the first bank contact engaged by the wiper 226 and leads through the winding of relay 4 to negative, so that this second transaction will operate relay 4 to register four units in the machine.

The fourth contact in the bank engaged by wiper 211 is connected through conductor 228 to wiper 229 in the switch R2, and the first contact in the bank engaged by this wiper is connected over 230 to the wiper 231 in the switch 2R3. Conductor 232 leads from the first bank contact engaged by wiper 231 through the winding of relay 6 so that an additional step by switch 2R1, before any of the other switches are stepped, will operate relay 6 to indicate the accumulation of six units in the register.

The fifth contact engaged by wiper 211 is connected through conductor 233 to the wiper 234 in the switch 2R2, and the first contact in the bank engaged by this wiper is connected through conductor 235 to the wiper 236 in the switch 2R3. Conductor 237 is connected to the first bank contact engaged by wiper 236 and leads to relay 8 so that an additional step by wiper 211 will energize relay 8 to indicate the accumulation of eight units.

*Simultaneous transactions*

It will frequently happen that the individual collectors in the three channels B1, B2, and B3, leading into the units register, will connect with ticket machines in which transactions are awaiting simultaneously, so that switches 2R1, 2R2, and 2R3 will all be operated. Assuming that the switches are in the position shown in Fig. 2 when this occurs, after each has taken one step, a circuit may be traced from positive at 210 through wiper 211 and its second contact, conductor 218, wiper 219 and its second contact which is connected to conductor 225, wiper 226 and its second contact which is connected to conductor 232, thence over that conductor through the relay 6 to negative, and the relay 6 will be operated to indicate the accumulation of six units in the register. If, for example, channels B1 and B2 are closed simultaneously, but B3 is not, switches 2R1 and 2R2 will take one step, but switch 2R3 will remain in the position shown in Fig. 2. The previously traced circuit to wiper 226 will, under these circumstances, be extended through the first bank contact and conductor 227 through the winding of relay 4 to indicate four units in the register. Thus it will be seen that regardless of the position of the wipers of the various switches an operation of any one switch will add two units to the register, an operation of any two switches will add four units, and an operation of all three switches simultaneously will add six units to the register.

As soon as the sum accumulated in the units register equals 10, transfer to the tens register must be made. This is accomplished as follows:

Transfer to tens register

Assume for the moment that relay 8 is operated to indicate eight units in the register, and that an additional transaction is received over channel 2B1. It will be noted that conductor 237 leading to the relay 8 is extended over conductor 238 which latter conductor splits through parallel paths, including normally open contacts on relays S1, S2, and S3. Since we are assuming that the additional transaction is coming in over circuit 2B1, contacts 239 controlled by relay S1 will be closed, extending the circuit of winding relay 2C to negative, operating the relay 2C. This relay locks itself in operated position from positive at 240 through normally closed contacts 241 that are operated by the units carry rotary switch 2CR, normally open contacts 242 on the relay 2C, through the winding of the relay to negative. Upon operating, relay 2C also closes contact 243 which closes the obvious circuit through the winding of magnet 2CR, Fig. 3, to effect the transfer in the manner hereinafter to appear. In the event that, under the conditions assumed, the transaction is received over the 2B2 or the 2B3 instead of the 2B1 channel, then the circuit over conductor 238 will be extended to relay 2C over the branch containing the contacts S2 or S3, instead of contacts 239; otherwise the operation will be as above. Thus it will be seen that when eight units are contained in the units register, receipt of an additional transaction over any one of the three channels will result in the operation of the carry relay 2C to effect a transfer to the tens register.

In the event that six units are registered in the units register and two transactions are received simultaneously, transfer will likewise be necessary since the sum will equal ten. This is accomplished by a circuit branching off conductor 232 through conductor 244, which circuit branches over parallel paths, the one extending through normally open contacts 245 controlled by relay S1, and then branches again through either one of contacts 246 controlled by relay S2 or contacts 247 controlled by relay S3. Thus the receipt of simultaneous transactions over channel B1, and either channel B2 or channel B3, will complete a circuit through the carry relay 2C to effect a transfer to the tens register. A second branch leading from conductor 244 extends through normally open contacts 248 controlled by relay S2 and contacts 249 controlled by relay S3, so that the receipt of simultaneous transactions over channels 2B2 and 2B3 will likewise complete a circuit for relay 2C to effect a transfer to the tens register.

In the event that four units are stored in the units register and three transactions are received simultaneously, transfer to the tens register will also occur. Conductor 227 leading to the relay 4 is extended over conductor 250, through contacts 251 controlled by the relay S1, contacts 252 controlled by the relay S2, and contacts 253 controlled by the relay S3, all of which contacts will be closed when the relays are energized simultaneously, thereby completing a circuit through the winding of relay 2C to negative, to operate this relay to effect a transfer.

Transfers on successive steps of the collector

In certain instances values may be received in the units register, in such sequence as to require transfers to the tens register on successive steps of the collectors. Thus, for example, if there are eight units registered in the units register and transactions are received simultaneously over the three channels, the sum of eight and six will equal fourteen, and transfer of ten will be made with four units remaining in the units register, this transfer being effected as above. If on the next step of the collectors, transactions are awaiting in each of the channels, six more units will be picked up and a second transfer will be necessary. Transfers on successive steps of the collector can be accomplished successfully if the transfer relay 2C operates as fast as the fundamental circuit relays 2B1, 2B2, and 2B3. While it is possible to maintain relay 2C in such an adjustment, its reliability under these conditions is not as great as desired and consequently arrangements are provided to prevent the necessity of transfer on two successive operations of the collectors.

As will be seen in Fig. 2, the circuit to relay S3 extends through normally closed contacts 254 which are opened when relay 2C is operated. Thus, during the first of the two successive transfers, all three channels can be operated simultaneously and relay 2C will be operated to effect the transfer. As soon as the acknowledging circuits are completed, the fundamental circuits are opened and the collectors allowed to take a second step. Because the relays 2B1, 2B2, and 2B3 operate faster than the relay 2C, these relays will be re-operated before relay 2C has restored to normal. On this second operation, relays 2B1 and 2B2 will complete circuits to their associate relays S1 and S2 as before, and four units will be added to the four units now assumed to be accumulated in the units register. Operation of relay 2B3, however, will not complete the circuit to relay S3 until relay 2C has restored after the previous transfer to the tens register has been completed. As soon as relay 2C does restore, relay S3 will operate and a circuit for relay 2C will be completed through contacts 255, since there are eight units already accumulated in the units register. This momentary delaying of the third of the three channels, in the event of successive transfers, insures that the carry relay 2C will have ample time to complete its cycle of operation to effect the transfer accurately.

The tens register

As will be seen in Fig. 3, there are three control channels leading into the tens register, one of which includes a switch 2CR, that is controlled by the units carry relay 2C. The second control channel is the five units value channel FB, which contains the basic circuit relay 5B, its associate slave 5S, and the rotary switch 5R, the operation of which are identical with that previously described for the two units channels. Switch 5R is equipped with five wipers each of which engage banks of twenty contacts, ten of which are employed, and the second ten multiple to the first ten, so that each individual circuit is completed twice as the switch steps over its bank contacts.

Switch 2CR employs but five contacts as in the units register, these contacts being multiplied so that each circuit is completed four times as the wipers make one sweep over their respective banks.

The third channel leading into the tens register is the tens units channel 10B which contains a fundamental circuit relay 10B, its associated slave 10S, and the rotary switch 10R. Switch 10R likewise employs five banks, and five contacts in each bank are utilized, the remainder being multiplied thereto so that each circuit is completed four times as the wipers sweep over their respective banks. The circuits of the switches in the tens register are as follows:

Wiper 301 engages contacts in its bank, the first two of which are connected through conductor 302 to the wiper 303 of the switch 2CR, and when there are zero units in the tens register the circuit is extended over conductor 304 through wiper 305 of the switch 10R and the first bank contact engaged thereby and to which conductor 306 is connected, conductor 306 leading through the winding of relay T0 to negative, to operate that relay to indicate zero units in the tens register.

The third and fourth contacts in the bank engaged by wiper 301 are connected through conductor 307 to the second wiper 308 in switch 2CR, and the first contact engaged by this wiper is connected through conductor 309 to the wiper 310 in the switch 10R. The first bank contact engaged by wiper 310 is connected through conductor 311 to the relay 10 so as to operate that relay to indicate ten units in the register.

The fifth and sixth contacts engaged by wiper 301 are connected over conductor 312 to the third wiper 313 in switch 2CR, the first bank contact engaged by this wiper being connected through conductor 314 to the third wiper 315 in switch 10R, and the first contact engaged by this wiper being connected over conductor 316 to the relay 20 to permit operating that relay to indicate 20 units in the tens register.

The seventh and eighth contacts engaged by wiper 301 are connected through conductor 321 to the fourth wiper 322 in switch 2CR, the first bank contact engaged by this wiper being connected through conductor 323 to the fourth wiper 324 in the switch 10R. The first contact engaged by wiper 324 is connected through conductor 325 to relay 30 to enable operation of that relay to indicate thirty units in the register.

The ninth and tenth contacts engaged by wiper 301 are connected through conductor 326 to the wiper 327 in the switch 2CR, and the first contact in the bank engaged by this wiper is connected through conductor 328 to wiper 329 in the switch 10R. The first contact engaged by wiper 329 is connected through conductor 330 to the relay 40 to permit operating that relay to indicate forty units in the register.

Since the switch 5R is operated one step for each five units value received in the register over the channel 5B, each second value so received will de-energize the register relay then operated and operate the next higher register relay to indicate ten units accumulated in the register.

The wiper 331 on the switch 5R sweeps over a bank of contacts, even numbered ones of which are strapped together and connected through conductor 332 to the relay O5. Thus, when the switch 5R takes one step, for example, from the number one contact on which the wipers are resting, in Fig. 3, to the number two contact, a circuit will be completed from positive through wiper 331, conductor 332, through relay O5 to negative, to operate that relay to indicate five units in the tens register. If it be assumed that switch 5R is standing on the first contact as shown in Fig. 1, this single operation will not break the circuit through wiper 301 to the relay T0 and that relay will remain operated and the total value then accumulated in the register will be five units.

Switch 2CR will be operated to take one step each time the carry relay 2C is operated to effect a transfer from the units register. The wipers 303, 308, 313, 322 and 327 take one step thereby to break the circuit of the register relay then operated and to close a circuit to the next higher register relay.

Switch 10R is operated each time a ten units transaction is received over the channel 10B and its wipers move one step also to de-energize the register relay then energized and to operate the register relay to indicate the next higher tens value.

*Simultaneous transactions in the tens register*

If the wipers of the switches of the tens register are in the position shown in Fig. 3, and simultaneous transactions are received over the channel 5B, the carry circuit from the units register, and the channel 10B, twenty-five units will be added to the value then accumulated in the register through the operation of the switches 5R, 2CR, and 10R, each through one step. Relay T0 will be restored to normal and relay 20 will be operated along with relay O5 to indicate twenty-five units in the register.

If the next step of the various collectors also closes all three of the control channels into the register, the three switches will again step, the switch 5R moving to de-energize the relay O5 by moving wiper 301 from an even to an odd contact, thereby transferring the circuits through that wiper to a different wiper in switch 2CR. Switches 2CR and 10R will step one step as before, and twenty-five units will thus be added to the twenty-five already assumed to be in the register, thereby making the total in the tens register equal fifty, which necessitates a transfer to the fifty units section of the hundreds register.

The fifty units section of the hundreds register, for convenience herein sometimes referred to as the "Fifty Register," consists of two register switches. One of these switches TCR, Fig. 4, is operated to take one step on each transfer from the tens register, and the other switch FR is operated to take one step each time a transaction is received over channel FB.

*Transfer from the tens to the fifty register*

With twenty-five units accumulated in the tens register, switch 5R will be standing on an even numbered contact, and a circuit for relay 20 will be completed over conductor 316, this conductor being extended through conductor 340 through the wiper 341 of switch 5R, then engaging an even numbered contact in its bank to which conductor 342 is connected, this conductor leading through contacts 343 closed by an operation of relay 5S, contacts 344 closed by an operation of relay 10S and contacts 345 closed by an operation of relay 2C, thereby extending a circuit through the winding of relay TC to negative. Relay TC upon operating locks itself from positive at 346 through normally closed contacts 347 on a re-set relay RST, normally closed contacts 348 on the magnet of the tens carry rotary TCR, conductor 349, through normally open contacts 350 closed by the operation of relay TC through the winding of relay TC to negative. Relay TC also closes contacts 351 thereby to close the obvious circuit to positive through the tens carry rotary switch magnet TCR to operate that magnet to effect a carry to the fifty register.

As soon as relays 5B, 10B, and 2C restore, their respective stepping switches each take a step and the wipers of the switches are positioned so as to extend the circuit to relay T0 thereby to complete the registration of the twenty-five units, all of which have been transferred from the tens to the fifty register.

In the event that thirty or thirty-five units are registered in the tens register, relays 30 and O5 will be operated and receipt of two simultaneous transactions over any two of the three channels leading into the tens register will necessitate a carry to the fifty register. Assume first that one of the transactions comes in over the 5B channel. A circuit may then be traced from conductor 325 through conductor 352, wiper 353 of the switch 5R, which will then be engaging an even numbered contact to complete the circuit for relay O5, conductor 354 which is connected to the even numbered contacts engaged by wiper 353, normally open contacts 355 which will be closed when relay 5S operates to initiate the registration of the transaction, and thence over either one of parallel paths, the one through contacts 356 which will be closed by relay 10S if the second of the two simultaneous transactions comes in over the 10B channel, thence through the winding of relay TC to negative, or through contacts 357 which will be closed by relay 2C if the second transaction comes in over the units carry channel, thereby to operate relay TC to effect a transfer.

If the two simultaneous transactions come in over the TB and units carry channels, a circuit may be traced from conductor 325, conductor 358, through normally open contacts 359 which will be closed by the operation of relay 10S, contacts 360 closed by the operation of relay 2C, and thence through the winding of relay TC to negative. Thus it will be seen that with thirty-five units registered in the tens register, any two simultaneous transactions received by this register will effect transfer; and with thirty units accumulated in the tens register, transactions received simultaneously over the units carry and tens units channels will likewise effect a transfer.

In the event that there are forty units in the tens register, an operation of either the units carry channel or the 10B channel will necessitate a transfer and a circuit may be traced from conductor 330 through conductor 361 and thence over parallel paths, the one through contacts 362 closed by the operation of relay 10S to complete the circuit for relay TC and the other through contacts 363 closed by relay 2C also to complete the circuit through relay TC.

In the event that in addition to the forty units in the tens register, there is also an odd five units value in the register, switch 5R will have its wipers positioned on even numbered contacts, and the circuit from conductor 330 will have a third parallel path extending through conductor 364 through wiper 365 of the switch 5R, conductor 366 connected to the even contacts engaged by this wiper, normally open contacts 367 closed by the operation of relay 5S through the winding of relay TC, and relay TC will be operated to effect transfer to the fifty register.

In order to insure that transfers from the tens register to the fifty register will be accurately made, the circuit of relay TS is extended from positive at 368 through normally closed contacts 369 on the relay 10C, through normally open contacts 370 on relay 10B through the winding of relay 10S to negative. So long as there is no carry in progress, TC will be deenergized and contacts 369 will be maintained closed so that when relay 10B operates, the circuit for relay 10S will be closed. If, however, relay TC is operated to effect a transfer, an operation of relay 10B will not be able to complete the circuit of relay 10S and the transaction coming in over the 10B channel will be delayed until the carry is completed.

Hundreds register

The hundreds register shown in Fig. 4 consists of a stepping switch TCR operated to effect transfers of fifty units from the tens register, a stepping switch FR operated over the fifty units channel FB to register fifty units transactions, which switches comprise the "Fifty Register," and a stepping switch HR operated over the hundred units channel HB to register one hundred units values. In the switch TCR one wiper 401 is employed and the odd numbered contacts in the bank engaged by this wiper are connected by conductor 402 to the first of two wipers 403 in the switch FR. The even numbered contacts of the bank in switch TCR are connected by conductor 404 to the second of two wipers 405 in the switch FR.

Switch FR likewise utilizes but two contacts, the odd numbered contacts in the bank engaged by wiper 403 and the even numbered contacts in the bank engaged by wiper 405 being connected together and to conductor 406. The even contacts engaged by wiper 403 and the odd contacts engaged by wipers 405 are likewise connected together and to the conductor 407. Assume for the moment that the wipers of the switches TCR and FR are in the position shown in Fig. 4, and that magnet TCR is operated to effect a transfer of fifty units from the tens register to the "Fifty Register." Upon the restoration of magnet TCR, a circuit may be traced from positive through wiper 401 and an even numbered contact in its bank, conductor 404, wiper 405, conductor 408, through the winding of the odd fifty relay O50 to negative, operating relay O50 to indicate that fifty units have been placed in the "Fifty Register."

A second fifty units value may come into the hundreds register, either over the fifty units channel FB or from the tens carry. Assume that the second fifty units value comes over the channel FB. Relay 50B will be operated and with it relay FS, responsive to the closing of contacts 409 on the 50B relay.

The circuit just traced to conductor 407 will now be extended over conductor 410, through contacts 411 closed by the operation of relay FS, through normally closed contacts 412 on the preliminary indication relay PI2, normally closed contacts 413 on the preliminary indication relay PI3 through the winding of the fifty carry relay FC1. FC1 operates, closing a locking circuit for itself that extends from positive at 414, contacts 415 closed by FC1, normally closed contacts 416 on relay FC2, through the winding of FC1 to negative. A circuit may now be traced from positive at 417, through normally closed contacts 418 on the hundreds rotary switch HR, conductor 419, contacts 420 closed by FC1, through the winding of fifty carry relay FC2 to negative. Relay FC2 operates and closes a momentary locking circuit for itself from positive at 414 through contacts 415, contacts 421, through the winding of relay FC2, this locking circuit being maintained but momentarily since operation of FC2 opens contacts 416 thereby breaking the locking circuit of relay FC1 which restores.

Operation of FC2 closes a second locking circuit for itself through contacts 422 to positive on conductor 419. Operation of relay FC2 closes a circuit for the hundreds rotary magnet HR through springs 423, energizing that magnet preparatory to stepping the hundreds rotary HR one step. Operation of magnet HR opens normally closed contacts 418, thereby breaking the locking circuit for relay FC2, to permit that relay to restore, whereupon the magnet HR is de-energized and the wipers of switch HR advanced one step to register one hundred units.

Operation of relay FS, as above, also closes the circuit for the magnet FR of the fifty rotary by operating contacts 424, energizing that magnet preparatory to stepping the wipers one step. As soon as the acknowledging circuit over channel FB has been completed, as explained in connection with Fig. 1, relay FS restores and the switch is stepped one step, whereupon wipers 403 and 405 will advance to their respective second contacts, thereby breaking the circuit over conductor 407 and opening the circuit of relay O50 permitting that relay to restore so that there will be but an even one hundred units registered in the hundreds register.

Assuming now that with an odd fifty units registered in the "Fifty Register" and with wiper 401 engaging its second bank contact, as explained above, the second fifty units registration comes in over the switch TCR. The circuit previously traced over conductor 410 will be extended through contacts 425 on the tens carry relay TC, thence through normally closed contacts 412 and 413 through the winding of relay FC1 to operate FC1, thereby to initiate the operation of relay FC2 and the hundreds rotary magnet HR as before.

Simultaneous placing of fifty units values in hundreds register

Assume for the moment that there are zero units accumulated in the hundreds register, in which case the wipers of switches TCR, FR, and HR will all be in the position shown in Fig. 4. Assume now that a fifty-unit value is received over the tens carry channel and simultaneously a fifty-unit value is received over the FB channel. Tens carry relay TC will be operated and the relay FS will likewise be operated. A circuit may now be traced from positive through wiper 401 and an odd numbered contact, conductor 402, wiper 403, and an odd numbered contact, conductor 406, through contacts 426 closed by the operation of relay FS, contacts 427 closed by the operation of relay TC through normally closed contacts 412 and 413 through the winding of relay FC1 to negative, initiating the operation of relays FC1, FC2, and magnet HR as above, thereby to operate the hundreds rotary HR one step to register one hundred units in the register.

Registering one hundred units values

One hundred units values enter the adding machine over the one hundred units circuit HB, operating relay 100B in the manner explained in connection with the fundamental circuit explanation accompanying Fig. 1. Relay HS will be operated if both relays FC1 and FC2 are normal at the time; that is, if there is no transfer from the "Fifty Register" to the one hundred register at the moment. A circuit may then be traced from positive at 430, through contacts 431 and contacts 432, both normally closed and operated by relays FC2 and FC1, respectively, contacts 433 on relay 100B, through the winding of relay HS to negative. Relay HS operates over this circuit closing normally open contacts 434, thereby closing the obvious circuit for the magnet HR which energizes preparatory to advancing the switch HR one step, which advance is made when the magnet restores responsive to the breaking of the circuit through relay 100B.

Transfer to the thousands register

As soon as the hundreds register switch HR has completed nine steps to register nine hundred units values in the register, wiper 435 will be standing on its tenth bank contact 436. The receipt of an additional hundreds value will operate the thousands register, as well as the hundreds register, the circuit being extended through wiper 435 and contact 436, conductor 437, and thence over one of two paths depending on whether this one hundred units value enters the machine over the hundreds channel HB or comes through the fifty units carry channel through the operation of relay FC2. Assume that it comes over the hundreds channel, relay HS will be operated to close springs 438, thereby extending the circuit through the winding of the thousands register control relay THX to negative, operating that relay which locks itself through springs 439 and normally closed contacts 440 on the thousands rotary THR to positive. Relay THX closes contacts 441, thereby closing the magnet THR which is energized preparatory to advancing the wipers of the thousands rotary THR one step. Operation of HS will also complete the circuit for magnet HR, and when relay HS restores, both of the switches HR and THR will take one step to indicate one thousand units in the thousands rotary, and zero units in the hundreds rotary.

The ten-thousands and one-hundred-thousands values are registered in the machine by apparatus duplicating the thousands register THR, which apparatus has been omitted from the drawings to avoid an unnecessary complication thereof. When nine thousand units are registered in the switch THR, wiper 442 will be engaging its ninth bank contact 443 to which the control relay of the ten-thousands register, not shown, is connected over conductor 444. Upon the receipt of the next one hundred units value, the circuit extending through contacts 438 on the relay HS will extend through relay THX as before, and also over conductor 445, through wiper 442, contact 443, and conductor 444 to the ten-thousand units control relay, so that the hundreds register, the thousands register, and the ten-thousands register will all take one step to complete the register of this one hundred units value.

Indicator

The sums accumulated in the various registers are indicated by suitable indicators positioned so as to be readily visible at one or more desired points associated with the totalisator. Thus, for example, at a race track indications would ordinarily be displayed on an infield board visible from the grandstand and on one or more boards elsewhere about the track.

As will be seen in Fig. 1, indicators are associated with each of the adding machines, the indicator 150 associated with the total adding machine 100 serving to display the sums accumulated in that adding machine. Each of the individual adding machines of which 105 is an example likewise has an associated indicator 151 which displays the sums accumulated from tickets sold on that individual runner.

The indicators 150 and 151 in the example shown each consist of a bank of lamps 700, Fig. 7, preferably consisting of four lamps in each horizontal row, and six rows placed one above the other vertically so that the indicator panel includes twenty-four lamps which are lighted in various combinations to indicate the value of one digit of the sum then accumulated in the adding machine. In the case of the total adding machine there will be a panel similar to 700 for the units digit, the tens digit, the hundreds digit, the thousands digit, the ten-thousands digit, and the hundred-thousands digit. In the individual adding machine indicator 151, the hundred-thousands digit ordinarily will be omitted.

Located upon the control panel of the totalisator system is a synchronous clockwork mechanism 500, driven from a source of alternating current indicated by the squares 501 and arranged to close a contact 502 at stated intervals, thereby completing the circuit for indicating relays IND. Two or more indicating relays are connected in multiple and each operated whenever contacts 502 are closed, each relay carrying a plurality of contacts by which the series of the various indicator lamps are controlled. Since the indicator relays IND operate simultaneously, they have the same effect as a single relay and are hereinafter referred to as a relay. Ordinarily the clockwork 500 will operate the relay IND at from ninety to one hundred twenty-second intervals so that the various amounts displayed on the display boards will remain there sufficiently long to permit accurate observation and at the same time will be changed with sufficient frequency that the amounts so indicated are up-to-date.

In Fig. 5, the indicator and control therefor, associated with the units digit of the sum to be displayed, are shown by way of example. The indicator lamps 1 to 24, inclusive, are controlled by five relays, I1, I2, I3, I4, and I5, two of which are operated simultaneously to form the various digits to be displayed. The register relays U0, 2, 4, 6, and 8, and the odd 5 relay O5, operate contacts which control the indicator relays I1 to I5, inclusive, in accordance with the sum then accumulated in the particular register operating two of the indicator relays.

In the event that the amount in the indicator at the moment that the indication is to be displayed is zero, indicator relays I3 and I4 will be operated to light lamps 2, 3, 8, 12, 16, 20, 23, 22, 17, 13, 9, and 5, thereby to form an arabic zero on the indicator panel 700. Since there are assumed to be zero units registered in the units register, relay U0 will be operated, the O5 relay will be in its normal position, and as soon as the timer 500 operates the relay IND circuits for relays I3 and I4 will be closed as follows: From positive at 510, through the normally closed contacts 511 controlled by the O5 relay, through contacts 512 on the U0 relay, conductor 513, through contacts 514 on the relay IND, through the winding of indicator relay I3 to negative, indicator relay I3 operating over this circuit and locking itself in operative position to positive at 515 through normally closed contacts 516 on the relay IND, conductor 517, through contacts 518 through the winding of relay I3 to negative. A circuit for relay I4 will be simultaneously completed through springs 511, springs 520 on the U0 relay, conductor 521, through contacts 522 on the relay IND, through the winding of relay I4 to negative, this relay operating and locking itself to positive on conductor 517 through contacts 523. A circuit for lamp 3 in the indicator panel 700 may now be traced from one side of a source of alternating current 525 through contact 526 closed by the operation of relay I3, conductor 527, through the lamp 3 to the other side of the source of alternating current on conductor 528.

A circuit branches off conductor 527 through normally closed contacts 529 on relay I1 through lamp 23 in the indicator panel to the opposite side of the source of alternating current, lighting lamp 23. A circuit for lamp 22 may be traced from a source of alternating current at 530, contacts 531 closed by the operation of relay I4, conductor 532, through the lamp 22 to the other side of the source of current, there being a branch of this circuit extending over conductor 533 through normally closed contacts 534 on relay I5, conductor 535, through lamp 20 to the other side of the source of alternating current. Lamp 5 is lighted over a circuit which may be traced from one side of the source of alternating current at 530, contacts 531 on relay I4, conductor 536, normally closed contacts 537 on relay I2, through lamp 5 to the other side of the source of current. Lamp 2 will be lighted from the source of alternating current at 540, contacts 541 closed by the operation of relay I3, conductor 542, through lamp 2 to the other side of the source of current. A branch leads off of conductor 542 through normally closed contacts 543 on relay I2, conductor 544, to light lamp 17. Lamp 16 is lighted over a circuit which may be traced from one side of the source of alternating current at 545, contacts 546 closed by the operation of relay I4, conductor 547, through lamp 16 to the other side of the source of alternating current.

Lamp 8 is lighted from the source of alternating current 548 through contacts 549 closed by the operation of relay I3, conductor 550, through lamp 8 to the other side of the source of current. Lamp 12 is lighted from the source of alternating current 551, contacts 552 closed by relay I3, contacts 553 closed by relay I4, conductor 554 through lamp 12 to the other side of the source of current. Lamp 9 is lighted from the source of current at 555, contacts 556 closed by relay I3, contacts 557 closed by relay I4, conductor 558 through lamp 9 to the other side of the source of current. Lamp 13 is lighted from the source of current at 559, contacts 560 closed by relay I4, normally closed contacts 561 on relay I2, conductor 562 through lamp 13 to the other side of the source of current.

The digits which the indicator 700 is capable of displaying are formed in accordance with the following table by operating the specified relays:

| Digit | Relays | Lamps |
| --- | --- | --- |
| 0 | 3 and 4 | 2, 3, 8, 12, 16, 20, 23, 22, 17, 13, 9, and 5. |
| 1 | 1 and 5 | 3, 7, 11, 15, 19, and 23. |
| 2 | 3 and 5 | 5, 2, 3, 8, 11, 14, 17, 21, 22, 23, and 24. |
| 3 | 2 and 3 | 1, 2, 3, 4, 8, 11, 16, 20, 23, 22, and 17. |
| 4 | 1 and 2 | 3, 7, 11, 15, 19, 23, 16, 14, 13, 9, and 6. |
| 5 | 2 and 5 | 4, 3, 2, 1, 5, 9, 10, 11, 16, 20, 23, 22, and 17. |
| 6 | 1 and 4 | 3, 2, 5, 9, 13, 17, 22, 23, 20, 16, 11, and 10. |
| 7 | 1 and 3 | 1, 2, 3, 4, 8, 11, 14, 17, and 21. |
| 8 | 4 and 5 | 2, 3, 8, 11, 16, 20, 23, 22, 17, 13, 10, and 5. |
| 9 | 2 and 4 | 2, 3, 8, 11, 12, 16, 20, 23, 22, 10, and 5. |

Digit 1 will be displayed in the units indicator when at the moment the indication is taken off of the registers there is an odd five registration in the tens register and six units in the units register. Relays I1 and I5, which must be operated to form the digit 1, are operated over circuits which may be traced from positive at 565, contacts 566 closed by the O5 relay, contacts 567 closed by the units relay 6 in the units register, conductor 568, contacts 569 on relay IND, through the winding of relay I5 to negative, operating that relay which locks itself through contacts 570 to positive on conductor 517. Relay I1 is operated over a circuit from positive at 571, contacts 572 on the units relay 6, conductor 573, contacts 574 on relay IND, through the winding of relay I1 to negative, operating this relay which locks itself through contacts 575 to positive on conductor 517. Relays I1 and I5, through their respective contacts, close circuits for the six lamps required to form the digit 1. Tracing of these circuits is not deemed to be necessary.

Digit 2 will be displayed when, at the moment the indication is taken off of the registers, there is no odd five registration in the tens register and there is a two units registration in the units register, the circuits for relays I3 and I5 necessary to form this digit being traceable from positive at 571 through contacts 576 on the units relay 2, contacts 514 on relay IND, through the winding of relay I3 to negative, this relay operating and locking itself through contacts 518 to the conductor 517. The circuit for relay I5 is completed from positive at 510, normally closed contacts 511, contacts 577 on the units relay 2, conductor 568, through contacts 569 on relay IND, through the winding of relay I5 to negative, this relay operating and locking itself through contacts 570 to positive on conductor 517.

The digit 3 will be displayed in the units register when there is an odd five registration in the tens register, and eight units in the units register, relays I2 and I3 being operated to form this digit over circuits traceable from positive at 565, through contacts 566 on the O5 relay, contacts 578 on the units relay 8, conductor 579, contacts 580 on relay IND, through the winding of relay I2 to negative, this relay operating and locking itself through contacts 581 to positive on conductor 517. The circuit for relay I3 extends through contacts 582 on the units relay 8, conductor 583, contacts 514 on relay IND, through the winding of I3 to negative, operating this relay which locks through contacts 518 to positive on conductor 517. Relays I2 and I3 jointly control the lighting of the lamps required to indicate the digit 3.

The digit 4 will be displayed when there is no odd five registration in the tens register and four units are accumulated in the units register, the circuits for relays I1 and I2 required to form this digit being traceable from positive at 510 through contacts 511, contacts 584 on the units relay 4, contacts 574 on relay IND, through the winding of relay I1 to negative, this relay operating and locking itself through contacts 575 to conductor 517. The circuit for relay I2 extends from positive at 571, contacts 585, conductor 579, contacts 580 on relay IND, through the winding of the relay to negative, the relay operating and locking through contacts 581 to positive on 517, as before.

Digit 5 will be displayed when there is an odd five in the tens register and zero in the units register, relays I2 and I5 being operated to form this digit. Relay I2 will be operated by positive placed on conductor 579, through contacts 586; and relay I5 from positive placed on conductor 568 through contacts 587, both circuits being completed through contacts 566 on the O5 relay to positive at 565.

Digit 6 will be displayed when there are six units in the units register and no O5 registration in the tens register, relays I1 and I4 required for this registration being operated over a circuit through normally closed contacts 511 on the O5 relay, contacts 588 on the relay 6, conductor 521, contacts 522, through the winding of relay I4; and relay I1 being operated from positive placed on conductor 573 through springs 572, as before.

Digit 7 will be displayed when there are two units in the units register and an odd five in the tens register, relay I3 being operated over the previously traced circuit through contacts 576, and relay I1 being operated over positive placed on conductor 573 through contacts 589 on the units relay 2, through contacts 566 on the O5 relay.

Digit 8 will be displayed when there are eight units in the units register and no odd five registration in the tens register. Relays I4 and I5 are operated to form this digit, relay I5 being operated from positive placed on conductor 568 through contacts 589 and 511, and relay I4 being operated by positive placed on conductor 521 through contacts 590 and 511.

Digit 9 will be displayed when there are four units in the units register and an odd five registration in the tens register, relays I2 and I4 being operated to form this digit. Relay I2 is operated by positive placed on conductor 579, through contacts 585, and relay I4 being operated by positive placed on conductor 521 through contacts 591 and 566.

*The tens digit indication control*

The indications of the tens digit of the sum are displayed through an indicator which duplicates the units indicator and is controlled by five relays which duplicate the control relays of the units indicator. These relays T1, T2, T3, T4 and T5, and the circuits over which they are controlled, are shown in Fig. 6. These circuits are controlled by the register relays T0, 10, 20, 30, and 40 in the tens register, by the O5 relay, and by the O50 relay. The relays T1 to T5, inclusive, upon operating, close contacts which extend circuits to the various lamps in the indicator panel in precisely the same manner as in the units indicator, which contacts and connections have been omitted from Fig. 6 to avoid an unnecessary duplication in the drawings.

Zero will be displayed in the tens digit indicator when the only registration therein is the O5 relay indicating a five units value and when the O50 relay is unoperated and the T0 relay is operated. Zero will likewise be displayed when the odd five relay is at normal and register relay T0 is operated. As explained in the table in the description of the units register, the digit zero is displayed when the relays I3 and I4 are operated. Assume first that the T0 relay is the only relay operated at the moment the indication is taken off. A circuit may be traced from positive at 601 through parallel branches, the one extending through normally closed contacts on the O5 relay and the other through normally closed contacts on the units register relays 6 and 8, conductor 602, normally closed contacts 603 on the O50 relay, contacts 604 closed by the T0 relay, conductor 605, contacts 606 on relay IND, through the winding of T4 to negative, to operate that relay which locks itself in a manner identical with the locking circuit of relays I1 to I5, inclusive. A circuit may also now be traced from positive at 607 through a similar parallel path through normally closed contacts on the O5, and relays 6 and 8, conductor 608, normally closed contacts 609 on the O50 relay, contacts 610 on the T0 relay, conductor 611, through contacts 612 on relay IND, through the winding of T3 to negative, operating relay T3.

In the event that the O5 relay is operated, these circuits for relays T3 and T4 will extend only through the normally closed contacts on relays 8 and 6 of the units register, but otherwise will be as above.

The digit 1 in the tens register will be displayed when the O5 relay is operated, and when either the units relays 6 or 8 of the units register are operated and the O50 relay is normal. Digit 1 will be displayed when the O5 relay is operated and the relay 10 in the tens register is operated, and also when relay 10 is operated and relay O5 is at normal. Assume first that the O5 and unit relay 6 are operated, and that there are no other values in the tens register, in which case relay T0 will likewise be operated. Relays I1 and I5 will be operated to form the digit 1 over circuit traceable from positive at 613, contacts 614, on the unit relay 6, contacts 615 on the O50 relay, conductor 616, contacts 617 on the O50 relay, contacts 618 on the T0 relay, conductor 619, contacts 620 on relay IND, through the winding of relay T5 to negative; and from positive at 620, contacts 621 on the unit relay 6, contact 622 on the O5 relay, conductor 623, contacts 624 on the O50 relay, contacts 625 on the T0 relay, conductor 626, through contacts 627 on relay IND, through the winding of T1 to negative. These relays will operate and lock, as hereinbefore explained. In the event that the relay 10 in the tens register is the only one operated, positive will be placed on conductor 626 from the previously traced circuit from 607, through springs 609 on the O50 relay, contact 628 on relay 10 to conductor 626. Positive will be placed on conductor 619 from the previously traced circuit beginning at 601 and extending through contact 603, through contact 629 on the relay 10, to conductor 619.

The foregoing will serve as examples of how T1 to T5 are operated under the joint control of the tens register relays, the units register relays 6 and 8, the O5 relay, and the O50 relay, to cause relays T1 to T5 to operate and display the digit required to properly indicate the sum registered in the registers at the moment the indication is taken off. Further description of the operation of the tens register indicator is not deemed necessary herein, as it will be merely a repetition of the foregoing, altered to meet the conditions imposed by the digit to be displayed.

The hundreds digit indication

The hundreds digits of the sums accumulated in the totalisator are displayed by an indicator duplicating that shown in Fig. 7, which indicator is controlled by five relays duplicating the control relays of the units and tens register. The circuits to these hundreds digit control relays, however, are extended directly from the banks of the hundreds register switch HR rather than through relay contacts, as in the units and tens register. In Fig. 4 these circuits are shown. Relay H1 will be operated responsive to the operation of the relay IND, through wiper 450 on the hundreds rotary HR, when that wiper is engaging its second bank contact to which conductor 451 is connected, and also when wiper 450 engages the fifth, seventh and eighth contacts in its bank, to which conductor 451 is also connected. A circuit may be traced from positive at 452 through any bank contact in the bank engaged by wiper 453 except the number one contact therein, through contacts 454 on relay IND, wiper 450, conductor 451, through the winding of relay H1 to negative. As will be seen in the foregoing table, relay H1 is operated when the digit to be displayed is 1, 4, 6, or 7.

Relay H2 will be operated through wiper 450 when that wiper engages 6t0 bank contact to which conductor 455 is connected, and this relay will also be operated through contacts 456 and wiper 457 when that wiper engages the fourth, fifth, and sixth contacts in its bank, to which conductor 455 is likewise connected.

Relay H3 will be operated through wiper 450 when that wiper is engaging the first, third and fourth contacts in its bank, to which conductor 458 is connected, and also through wiper 457 when that wiper is engaging its eighth bank contact to which conductor 458 is also connected.

Relay H4 will be operated when wiper 457 engages its first bank contact, to which conductor 459 is connected, and also when that wiper engages its seventh, ninth, and tenth contacts to which conductor 459 is also connected.

Relay H5 will be operated through wiper 450 when that wiper engages its sixth and ninth bank contacts to which conductor 460 is connected, and also operated through wiper 457 when that wiper engages its second and third bank contacts to which conductor 460 is also connected.

When the wipers of switch HR are engaging the first bank contact, as shown in Fig. 4, and the wipers of the thousands register switch THR and succeeding switches are likewise in their first or home position, operation of contacts 454 and 456 on relay IND will not extend positive to any of the relays H1 to H5, inclusive, and there will be no indication in the hundreds register. This will occur in the early stages of operation when the sum accumulated in the adding machine does not yet equal one hundred units.

The thousands register

The thousands register and control therefor duplicate the hundreds register, and control is effected through wipers 470 and 471 of the thousands rotary switch THR. Since these circuits are identical with those of the hundreds register, they have been omitted from the drawings to avoid an unnecessary complication thereof.

Preliminary indication

In certain instances, in order that the indicators will properly indicate the sums accumulated in the adding machine, it will be necessary to operate the hundreds register preliminary to and before a normal transfer to this register is in order. Thus, for example, if at the moment the indication is taken off there is an odd fifty registration in the fifty register, an odd five registration in the tens register, and also forty units registered in this register, the sum of these values will equal 95; and if either the units register relay 6 or the units register relay 8 is in operated position, this odd value sum will exceed one hundred and the hundreds rotary HR will be operated over circuits shown in Figs. 3 and 4. Since under the conditions assumed relay 40 in the tens register is operated, there will be positive on the conductor 330 which will be extended over conductor 380 to either contact 381 on the units relay 6 or contacts 382 on the units relay 8, one of which is operated under the conditions assumed, contacts 383 on the O5 relay, contacts 384 on the O50 relay, to conductor 385.

In the timing device 500, Fig. 5, are contacts 563 which are closed momentarily just before main contacts 502 are closed. Contacts 563 close the obvious circuit for the preliminary indication relay PIND, operating that relay. Relay PIND closes contacts 386, Fig. 3, extending the positive on conductor 385, through normally closed contacts 475, Fig. 4, on the PI2 relay, through the winding of relay PI1 to negative, operating relay PI1. This relay closes a circuit from positive at 476, through contacts 477 on the PI1 relay through the winding of PI2 to negative, operating PI2, which locks itself through contacts 478, 479, and 480 to positive at 476. Operation of relay PI1 will close a circuit from positive on conductor 410, which conductor will carry positive since relay O50 is operated under the conditions assumed, contacts 481, through the winding of relay FC1 to negative, operating relay FC1, which closes contacts 420, thereby closing the previously traced circuit from positive at 417 through the winding of relay FC2 to negative, operating relay FC2, which closes contacts 423, thereby to step the rotary switch HR one step to register therein the one hundred units made up of the odd values mentioned.

With relay PI2 locked up as above, the next pulse which normally would operate FC1 and FC2 to effect a carry to the hundreds register, will be diverted, inasmuch as contacts 412, through which the circuit over which this pulse travels is extended as hereinbefore explained, will be opened. Assume for the moment that the next transfer to the hundreds register comes in over the fifty channel and that relay FB and FS are operated, contacts 411 will be closed and the circuit will be extended through contacts 482 through the winding of relay PI3 to negative, operating PI3 which opens contacts 413, to insure that relay FC1 will not operate, and unlocks relay PI2 by opening contacts 479. Relay PI3 locks itself through contacts 483 and contacts 411 to insure that it will remain in operating position so long as the pulse remains on conductor 410. As soon as this pulse goes off, indicating the completion of an attempt to transfer to the hundreds register, relay PI3 restores, so that the next transfer to the hundreds register will go through in the normal manner.

It will be noted that the preliminary operation of the hundreds register switch HR occurs just prior to an operation of the indicator relay IND. It follows then that this preliminary operation of HR will facilitate an accurate indication of the hundreds digit of the sum accumulated regardless of the fact that the various lesser value registers, in which parts of the odd values sum are accumulated, have not reached a transfer value.

So long as the indicator relay IND remains operated the various indicator relays, such as I1—I5, for example, will be maintained operated over the circuit over which they were operated. When relay IND restores contacts 516 close before the other contacts on the relay open and positive will be placed on the locking conductors, such as 517, to maintain the operated indicator in operated position, thereby to maintain the digits indications until the beginning of the next indication cycle.

*Reset*

At the beginning of each series of operations to be registered and indicated by the totalisator, the various stepping switches and relays must be restored to a normal position so that the first indication given before any transactions are registered will consist only of zeros. To this end, a manually controlled switch, not shown, is closed by the attendant, thereby to operate one or more reset relays, not shown, to close the reset contacts RST appearing throughout the figures herein. Since the number of contacts RST to be operated exceeds the number that can be carried by a single relay, a plurality of reset relays are provided and operated in multiple which electrically is the same as a single relay.

The operation of the reset relay restores the units register by closing contacts 270, 271, 272 and 273. If the switches 2R1, 2R2, and 2R3 are in such positions as to extend a circuit to relay 2, 4, 6, or 8, closing of these contacts 270 to 273, inclusive, will place positive on conductor 274, thereby extending a circuit through normally closed contacts 275 on the rotary switch 2R1, through the winding of magnet 2R1 to negative, operating that magnet which interrupts its own circuit by opening contacts 275, and restores to advance the wipers one step. If positive is still present on conductor 274, the magnet will continue to operate in buzzerlike fashion until wiper 211 engages a contact through which a circuit is extended to relay U0 rather than any one of the other relays in the register, and positive will be removed from conductor 274 and the switch will come to rest with the units register at zero position. It will be noted that switches 2R2 and 2R3 are not restored to normal position, but rather remain in the position last used to start the succeeding series of registrations from this position.

The tens register is restored to normal by closing of reset contacts RST387, 388, 389, 390, and 391, to which conductors 332, 311, 316, 325, and 330 are connected. If the wipers of switches 5R, 2CR, and 10R are in such position that either relay 10, 20, 30, or 40 is in operated position, positive will be placed on conductor 392 and will extend through normally closed contacts 393 on the five units rotary 5R, through the winding of the magnet 5R to negative, operating that magnet which interrupts its own circuit by opening contacts 393. The magnet restores and advances the wipers of switch 5R one step, and if positive is still present on conductor 392 this operation will be repeated. As soon as the wipers of switch 5R reach a contact through which a circuit is extended to the T0 relay and is not simultaneously extended to the O5 relay, the positive on conductor 392 will be removed and the switch will come to rest with the tens register at zero. Switches 2CR and 10R are not reset, but rather will commence the next series of registrations from the position in which they are located at the conclusion of the previous series.

Closing the reset contacts 446 and 447 will complete a circuit from positive on wiper 401 on switch TCR, conductor 408, conductor 394, normally closed contacts 348 on this switch, contacts 447, through the winding of the magnet TCR to negative, operating that magnet which interrupts its own circuit by opening contacts 348. The magnet restores and advances the wipers 401 one step, thereby to open the circuit just traced and the fifty units register is thus restored to normal.

The hundreds units register is restored when the reset relay is operated over a circuit which may be traced from positive at 417, normally closed contacts 418 on the hundreds rotary switch, wiper 490, any contact of the bank of this wiper 490, except the number one contact, contacts 491 on the reset relay, through the winding of magnet HR to negative, this magnet operating its own circuit by opening contact 418 to advance the wipers of switch HR step-by-step until the wipers reach the position in which they are shown in Fig. 4.

The thousands and ten-thousands rotary switches are restored to normal in a manner identical with that of the hundreds rotary HR.

From the foregoing, it will be apparent that the registers of the adding machine of the present invention are each capable of accepting a plurality of transactions simultaneously and registering those transactions without interference one with the other. Transfers are made from a lower register to a higher register when necessary, and at the moment of transfer one of the channels leading into the register that is making the transfer is momentarily disabled so as to prevent a transaction received over that channel from interfering with the transfer. Through this arrangement, registrations can be received at very high speed and accumulations in the adding machines made with accuracy. The fundamental control circuits are operated on a wider margin between maximum and minimum current values, thereby to permit a wider latitude of adjustment of the relays to further enhance speed without sacrificing accuracy.

While I have chosen to illustrate my invention by showing and describing a preferred embodiment of it, I have done so by way of example only, as there are many modifications and adaptations which can be made by one skilled in the art within the teachings of the invention.

Having thus complied with the statutes, and shown and described a preferred embodiment of my invention, what I consider new and desire to have patented by Letters Patent is pointed out in the appended claims.

What is claimed is:

1. In a totalisator system adding machine; a tens register in which tens values are accumulated; a hundreds register in which fifty and hundred units values are accumulated; a tens carry relay; means including said tens carry relay for effecting a transfer to the hundreds register; a ten units value channel leading into said machine; means including a tens channel relay that is operated upon the receipt of a ten units value over said channel for operating said tens register to register said value therein; and a circuit for said tens channel relay extending through normally closed contacts on said tens carry relay, said contacts being opened by an operation of the tens carry relay to prevent an operation of only the ten units channel relay during a transfer to the hundreds register.

2. In a totalisator system adding machine; units register relays operable to register zero, two, four, six, and eight units respectively; a plurality of independent channels leading into said adding machine; a stepping switch for each channel; a single set of contacts on one of said switches; a plurality of sets of contacts on the other switches; a wiper for each set of contacts, which wiper steps sequentially over the contacts as the switch steps; circuit connections between the contacts of each one of said switches and the wipers of a succeeding switch and between the contacts of the last one of said switches and said register relays, over which connections one of said relays is operated to register the units then accumulated in the adding machine; a magnet for each stepping switch; a relay for each channel operated when a value is received over that channel; a circuit for each magnet closed by the associated channel relay in operated position to operate the magnet and thereby step the associated switch one step, the wipers of said switch opening the circuit of the register relay then energized and closing a circuit to the register relay for the next higher value thereby to register that value in the adding machine, a reset relay; and circuit means closed by said reset relay to the magnet of said single wiper switch over which circuit the switch is operated until a circuit is closed to the zero register relay, thereby to reset the register to zero.

3. In a totalisator system adding machine; units register relays operable to register zero, two, four, six and eight units respectively; three independent channels leading into said adding machine; a stepping switch for each channel; a single set of contacts on one of said switches; a plurality of sets of contacts on the other switches; a wiper for each set of contacts, which wiper moves sequentially over the contacts as the switch steps; circuit connections between the contacts of a first one of said switches and the wipers of a second one of said switches; circuit connections between the contacts of said second switch and the wipers of a third one of said switches; circuit connections between the contacts of said third switch and said register relays; means for completing a circuit through said wipers, contacts and connections to one of the register relays to operate that relay to register the units then accumulated in the adding machine; a relay for each channel energized when a value is received over that channel; a magnet for each stepping switch; a circuit for each magnet closed by the associated channel relay in energized position to operate the magnet and thereby step the associated switch one step; the wipers of said switch opening the circuit of the register relay then energized and closing a circuit to the register relay for the next higher value thereby to register that value in the adding machine.

4. In a totalisator system adding machine; units register relays operable to register zero, two, four, six, and eight units respectively; a plurality of stepping switches; wipers in each switch; a bank of contacts over which an associated wiper steps as the switch steps; circuit connections between the contacts of each switch and the wipers of a succeeding switch and between the contacts of the last one of said switches and said register relays; means for closing a circuit through said wipers and connections to one of said register relays to operate that relay to register the units value then accumulated in the adding machine; means including a relay for each switch for stepping that switch thereby to open the circuit of the register relay then energized and close a circuit to the register relay for the next higher value thereby to operate that relay to register that value; a tens register; a carry relay operable to transfer to the tens register values of ten units accumulated in the units register; a circuit for said carry relay paralleling said eight units relay and closed by contacts on any one of said stepping switch relays to operate the carry relay simultaneously with any one of the switches when eight units have been accumulated; a second circuit for said carry relay paralleling said six units relay and closed by contacts on any two of said stepping switch relays to operate the carry relay simultaneously with any two of the switches when six units have been accumulated; and a third circuit for said carry relay paralleling said four units relay and closed by contacts on three of said stepping switch relays to operate the carry relay simultaneously with the three switches when four units have been accumulated in the units register.

5. In a totalisator system adding machine; units register relays operable to register zero, two, four, six and eight units respectively; a plurality of independent channels leading into said adding machine; a stepping switch for each channel; a single set of contacts on one of said switches a plurality of sets of contacts on the other switches; a wiper for each set of contacts, which wiper steps sequentially over the contacts as the switch steps; circuit connections between the contacts of each one of said switches and the wipers of the succeeding switch and between the contacts of the last switch and said register relays; means for completing a circuit through said wipers and circuit connections to one of said register relays to operate that relay to register the units value then accumulated in the adding machine; a magnet for each stepping switch; a relay for each channel operated in response to the closing of a circuit over said channel; a circuit for each magnet closed by the associated channel relay in operated position to operate the magnet and thereby step the associated switch one step, the wipers of said switch opening the circuit of the register relay then energized and closing a circuit to the register relay for the next higher value thereby to operate that relay to register that value in the adding machine; a tens register in said adding machine; a carry relay; a circuit for said carry relay completed when the units registration equals ten to operate that relay thereby to register ten in said tens register; and contacts on said carry relay opened by said carry relay in operated position and included in the circuit of one of said channel relays for opening the circuit of only one of said channel relays thereby to prevent an operation of that relay and stepping switch while said carry relay is making a transfer to said tens register.

6. In a totalisator system adding machine; a units register operable to register zero, two, four, six, and eight units, a plurality of stepping switches having wipers and banks of contacts over which the wipers step as the switch steps; connections between the contacts of one switch and the wipers of the succeeding switch and between the contacts of the last switch and the units register; means for closing a circuit over said connections to operate said register to register the units value then accumulated in the machine; a relay for each stepping switch operated when a unit value is received in the machine; a circuit for each stepping switch closed by the associated relay in operated position to operate that switch and thereby reoperate the register to add the units value therein; a tens register; a carry relay operable to transfer values to the tens register when the sum in the units register equals ten; circuits for said carry relay controlled jointly by said switches and associated relays and closed when ten units are registered in the units register to operate the carry relay to effect a transfer to the tens register; and contacts opened by the carry relay in operated position and included in the circuit of only the relay associated with the last one of said stepping switches to prevent an operation of that switch during a transfer effected by said carry relay.

7. The combination with a plurality of electrical devices operable together in combinations of three, of control means therefor comprising a high sensitivity relay in each of two devices of the combination, a low sensitivity relay in the third device of the combination, a resistor in one of said two devices, means for establishing a series circuit through said three relays and resistor, means for energizing said circuit to operate the two high sensitivity relays thereover to control the associated devices, normally open contacts in two of said devices closed by the device moving into operated position, and a circuit extending through said closed contacts in series for short-circuiting said resistor to increase the current flow in said circuit thereby to operate said low sensitivity relay to control the associated device.

8. In a totalisator system, a total adding machine, an individual adding machine, a high sensitivity relay in each adding machine, a ticket machine, a low sensitivity relay in said ticket machine, a resistor, a collector, means including said collector for establishing a series circuit through said resistor and said three relays, means for energizing said circuit to operate the high sensitivity relays, a register in said total adding machine, means responsive to an operation of said associated high sensitivity relays for operating said register, contacts closed by said register, contacts closed by said high sensitivity relay; a register in said individual adding machine, means responsive to an operation of said associated high sensitivity relay for operating said register, contacts closed by said latter register, contacts closed by said latter high sensitivity relay, means including a circuit closed by the contacts in said individual and total adding machines for short-circuiting said resistor thereby to increase the current flow in said series circuit to operate said low sensitivity relay thereby to control said ticket machine, and contacts opened by said low sensitivity relay for opening said series circuit.

9. In a totalisator system adding machine; a tens register including a relay for zero, ten, twenty, thirty, and forty units values; three stepping switches having banks of contacts and wipers that are moved from contact to contact as the switches step; connections between said contacts and wipers and relays; means for closing a circuit over said connections to operate said relays one at a time to register the value then accumulated in the register; a five unit channel leading into said machine; means including a channel relay operated when a five unit value is received over said channel for operating a first one of said stepping switches through one step; a units register; a carry relay in said units register operated when the value accumulated therein equals ten units; means controlled by said carry relay for operating a second one of said stepping switches through one step; a ten units channel leading into said machine; a tens channel relay operated when a ten units value is received over said tens channel for operating the third stepping switch through one step;

a hundreds register; a tens carry relay operable when the value accumulated in the tens register equals fifty units to transfer that accumulation to the hundreds register; a connection branching off of the circuit to the twenty units relay in the tens register and extending to a first wiper in the first of said switches; an odd five units relay in said register; a circuit for said odd five relay completed through the even contacts in a second row of the bank of said first switches and the wiper engaged thereby to operate the odd fives relay to register an odd five units value; and a circuit for said tens carry relay completed through said first wiper and the even contacts engaged thereby, and normally open contacts on the fives channel relay, the tens channel relay and the units carry relay when twenty-five units are accumulated in the tens register and values are simultaneously received over the fives and tens channels and the units carry channel to operate the tens carry relay and effect the transfer of fifty units to the hundreds register.

10. In a totalisator system adding machine; a tens register, a relay in said register operable to register forty units in said machine; means for operating said relay when the sum accumulated in said register equals forty units; a five unit channel leading into said machine; a stepping switch; a relay associated with said stepping switch; means for operating said relay responsive to the receipt of a five unit value in said machine; means operated by said associated relay in operated position for operating said switch to take one step, thereby to register an odd five units value in said machine; a hundreds register; a carry relay operable when the value accumulated in said tens register equals fifty units; a wiper on said switch; a plurality of contacts engaged sequentially by said wiper as the switch steps, said wiper engaging an even numbered contact when an odd five unit value is registered in the machine; a direct connection from said forty units relay to said wiper; a connection extending from the even numbered ones of said contacts through normally open contacts on the relay associated with said stepping switch to said carry relay, a circuit closed over said connections, when said wiper is engaging an even numbered contact and said associated relay is operated upon the receipt of a second five units value in said machine, to operate said carry relay in parallel with said forty units relay and thereby effect a transfer of fifty units to said hundreds register.

11. In a totalisator system adding machine; a tens register; a relay in said register operable to register thirty units in said machine; means for operating said relay when the sum accumulated in said register equals thirty units; a five units channel leading into said machine; a stepping switch associated with said channel; a tens units channel leading into said machine; a stepping switch associated with said tens units channel; a relay associated with each of said channels and its associated stepping switch; means for operating the five units channel relay responsive to the receipt of a five units value in the machine; means operated by said five units relay for operating the associated stepping switch through one step thereby to register a five units value in said machine; a hundreds register; a carry relay operable when the value accumulated in said tens register equals fifty units; means for operating the ten units channel relay responsive to the receipt of a ten units value in the machine; a wiper on said five units switch; a plurality of contacts engaged sequentially by said wiper as the switch steps, said wiper engaging an even numbered contact when an odd five unit value is registered in the machine; a direct connection from said thirty units relay to said wiper, a connection from the even numbered ones of said contacts through normally open contacts on said five and ten units channel relays to said carry relay, a circuit closed over said connections when said thirty units relay is energized, and said wiper is engaging an even numbered contact and the five and ten units channel relays operate simultaneously in response to the receipt of a second five units value and a ten units value, respectively, in said machine to operate said carry relay in parallel with said thirty units relay and thereby effect a transfer of fifty units to said hundreds register.

12. In a totalisator adding machine, a tens register in which the tens digit of the sum accumulated in the machine is registered; a hundreds register; a switch in said hundreds register operable through one step to register fifty units in the register, a relay in the tens register operated when the sum in that register equals fifty units to operate said switch through one step; a second switch in said hundreds register operable through one step to register fifty units in the register; a fifty units channel leading into the machine; a relay operated when a fifty units transaction is received over said channel to operate said second switch through one step to register fifty units; an odd fifty units relay; a circuit for said fifty units relay controlled jointly by said switches and closed when one fifty units value is in the register; a hundred units switch in said hundreds register operable through one step to register one hundred units; a hundred units channel leading into said machine; a relay operated when a one hundred units value is received over said hundreds channel to operate said hundreds switch one step; a pair of transfer relays; a circuit for said transfer relays controlled jointly by said fifty units switches and closed each time one hundred units are placed in the fifty register; circuit means controlled by said transfer relays in operated position and over which said hundreds switch is operated through one step to transfer said hundred units from the fifty to the hundreds register; and contacts opened by said transfer relays and included in the circuits of said fifties and hundreds channel relays to prevent an operation of those relays during said transfer.

ARTHUR J. JOHNSTON.

REFERENCES CITED

The following references are of record in the file of this patent:

UNITED STATES PATENTS

| Number | Name | Date |
|---|---|---|
| 1,319,215 | Foote | Oct. 21, 1919 |
| 2,032,972 | Black et al. | Mar. 3, 1936 |
| 2,167,513 | Johnston | July 25, 1936 |
| 2,182,875 | Levy | Dec. 12, 1939 |
| 2,261,686 | Kesselring | Nov. 4, 1941 |
| 2,362,021 | Nazar | Nov. 7, 1944 |

FOREIGN PATENTS

| Number | Country | Date |
|---|---|---|
| 419,600 | Great Britain | Nov. 12, 1934 |